United States Patent Office 3,448,844
Patented June 10, 1969

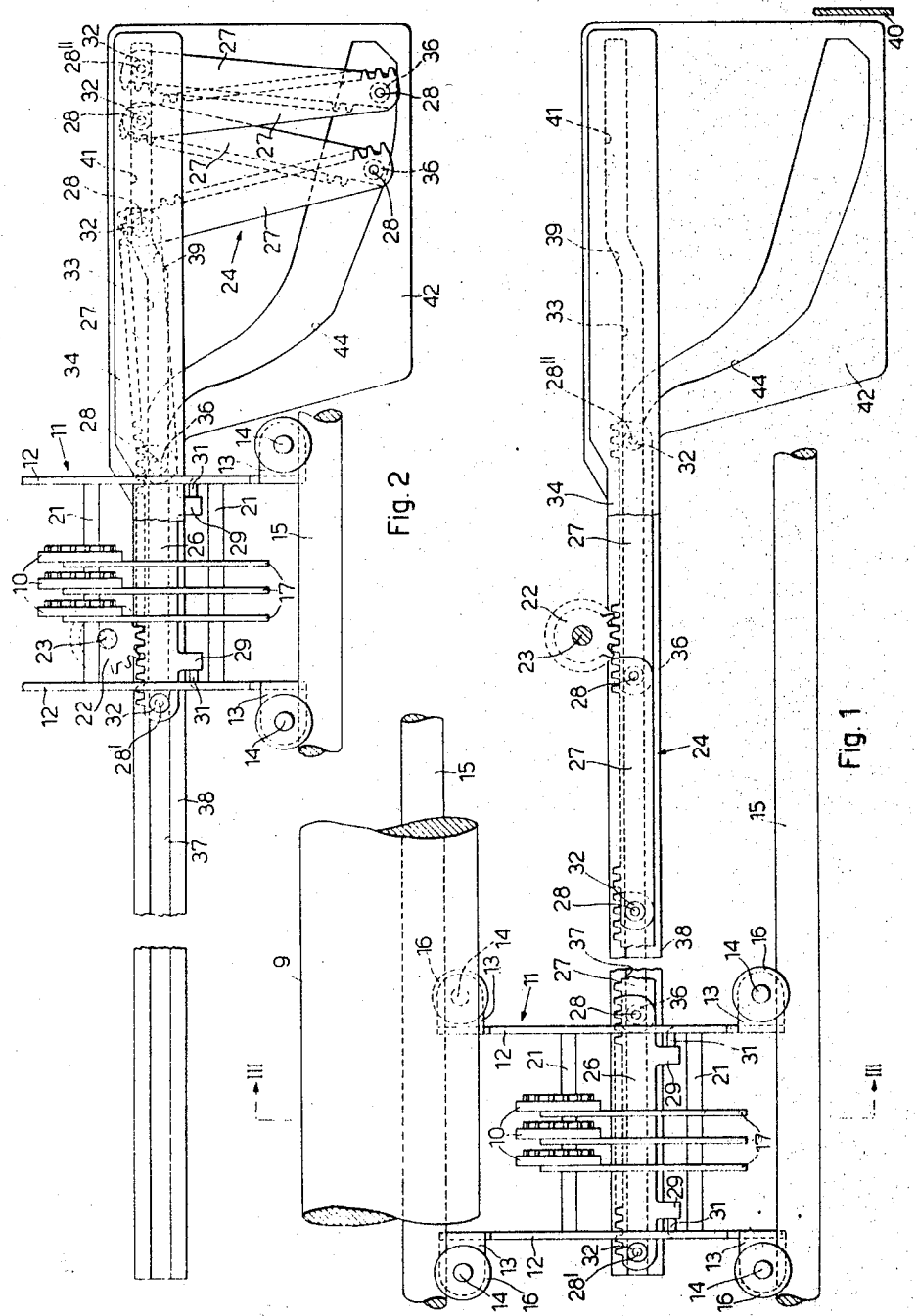

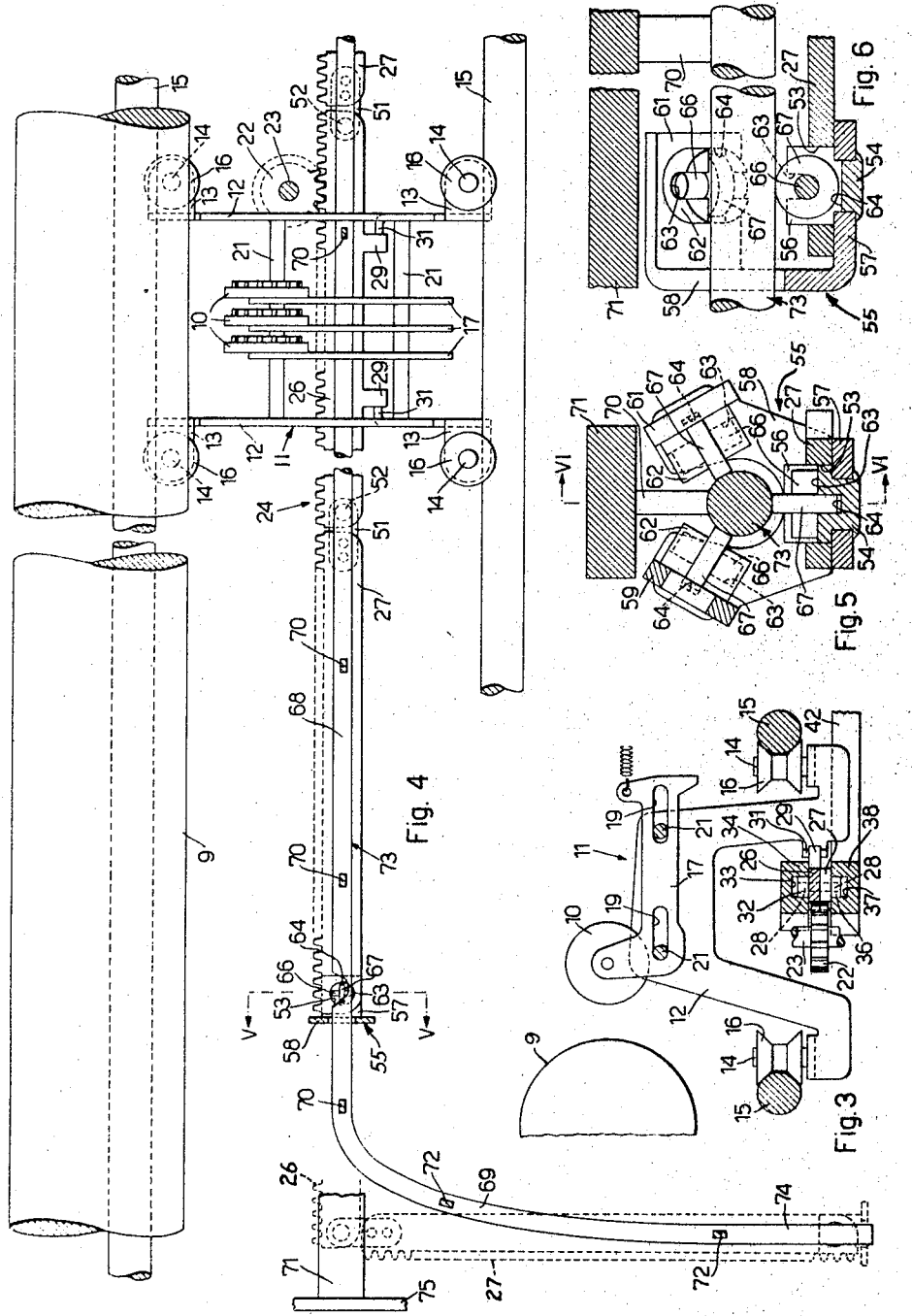

3,448,844
DEVICE FOR TRANSVERSELY DISPLACING A TYPECARRIER CARRIAGE INCLUDING A FOLDING RACK
Teresio Gassino and Nicolo Giolitti, Ivrea, Italy, assignors to Ing. C. Olivetti & C., S.p.A., Ivrea, Italy, a corporation of Italy
Filed June 12, 1967, Ser. No. 645,179
Claims priority, application Italy, June 20, 1966, 33,976
Int. Cl. B41j 19/18
U.S. Cl. 197—82
9 Claims

ABSTRACT OF THE DISCLOSURE

A device for transversely displacing a typecarrier carriage of a typewriter with respect to a stationary platen has a pinion which intermeshes with rack means comprised at least of two mutually hinged racks. One of said racks is connected for movement parallel with said carriage and the other rack has an element thereon so governed by guiding means as to enable it to come to lie along a side end plate of the machine frame when it approaches such plate.

Background of the invention

This invention relates to a device for transversely displacing a typecarrier carriage of a typewriter or similar printing machine with respect to a stationary platen, wherein a pinion intermeshes with rack means connected to said carriage.

In conventional typewriters having a paper carriage, the carriage controlling devices usually comprise a rack carried on the carriage which is meshing with a pinion on the frame, the rack being substantially as long as the carriage in its transverse stroke. In the typewriters having a transversely movable typecarrier carriage, the transverse size of the carriage is much shorter than its traveling stroke and therefore when the carriage approaches a lateral end plate of the machine frame, the rack has moved to a laterally projecting position beyond such plate and creates a condition which is dangerous and undesirable.

To obviate this disadvantage an organization has previously been proposed wherein the rack is secured to the machine frame and wherein a pinion, and therefore an escapement mechanism is carried to travel with the carriage. However, in such organization the escapement mechanism needs to be controlled by an objectionably long universal bar.

One known typewriter has a type head movable transversely over a flat work sheet or book and further has an escapement pinion on said head. Such pinion, by co-operation with different sections of a normally stationary, extended telescopic rack, is adapted to control the letter feed position of said head on the work sheet. The telescopic rack is in an extended state throughout carriage travel. Namely, it is never contracted during carriage travel. The purpose for contraction is for packing the machine into a small case.

There are also known carriage displacing devices comprising cables or other flexible members, which are not reliable in the operation.

Summary of the invention

In the machine of the invention a rack means in control of the carriage comprises a first rack having association with the carriage for concerted movement always parallel therewith, and comprises further at least another rack having a hinged connection with one end of said first rack. Guide means carried on the framework of the machine cooperate with said other rack or racks to swing such racks, when they approach a side of the machine, to fold-away positions so that they do not objectionably project from the machine. According to a first embodiment of the invention several of said other racks become folded away in transversely adjacent relations.

According to a second embodiment of the invention the rack which moves parallel with the carriage has linked to it at one or both of its ends at least one other rack, and such rack or racks are directed by guide means from horizontal to vertical position as they transgress laterally beyond given positions.

This and other characteristics of the invention will become apparent from the following description of two preferred embodiments, and from the accompanying drawings.

Brief description of the drawings

FIG. 1 is a partial plan view of a printing machine incorporating a device for transversely displacing a typecarrier carriage according to a first embodiment of the invention;

FIG. 2 is a plan view similar to FIG. 1, but the carriage is displaced rightwards;

FIG. 3 is a left hand partial longitudinal sectional view taken according to the line III—III of FIG. 1;

FIG. 4 is a partial plan view of a printing machine incorporating a device for transversely displacing a typecarrier carriage according to a second embodiment of the invention;

FIG. 5 is a partial sectional view taken according to the line V—V of FIG. 4, in an enlarged scale.

FIG. 6 is a sectional front view taken according to the line VI—VI of FIG. 5.

Description of the preferred embodiments of the invention

With reference to FIG. 1, the numeral 9 generically indicates a platen of a printing machine, for example a typewriter, a teleprinter, or an accounting machine. The platen 9 is transversely stationary on the machine frame and is adapted to cooperate with a set of typewheels 10 mounted on a transversely movable carriage, generically indicated by the numeral 11. The carriage 11 is formed of a pair of plates 12 each one having two legs 13 provided with a pivot 14 which rotatably mounts on a roller 16. The carriage 11 is transversely slidable with the rollers 16 along a pair of shafts 15 secured to the machine frame. Each typewheel 10 (FIG. 3) is rotatable on a slide 17 and such slide is provided with two slots 19 to render it longitudinally slidable on two bars 21 secured to the carriage 11.

Rotatably mounted on a vertical pivot 23 which is secured to the machine frame is a pinion 22 intermeshing with a rack means generically indicated by the numeral 24 (FIG. 1). The pinion 22 is adapted to be rotated under the control of a conventional escapement device, not shown, in the drawings, or in any other known manner. The rack 24 (FIG. 1) is formed of at least two racks 26 and 27 mutually hinged by a pivot 28. The rack 26 is provided with two front lugs 29 engaging two lugs 31 bent from the plates 12 of the carriage 11. Obviously the pinion 22 is of such length as to be able to mesh with any of the various racks 26, 27 of the rack means 24.

In the embodiment shown in FIGS. 1–3 the rack means 24 comprises linked together in a rightward order the rack 26 and five racks 27. Secured to the left hand end of the rack 26 is a pivot 28', whereas secured to the right hand end of the rightmost rack 27 is a pivot 28''. The pivots 28' and 28'' project upwards, whereas pivots 28 link the various racks 26 and 27, and beginning with the leftmost pivot 28 project alternately upward and downwards. Rotatably mounted on each pivot 28′ and 28″, and on each upwardly projecting pivot 28, is a roller 32 (FIG. 3) adapted to slide in an upper, linear guide member or groove 33 provided on a frame supported stationary bar 34. Rotatably mounted on each pivot 28 projecting downwards is a roller 36 adapted to slide in a lower, rectilinear guide member or groove 37 provided on a second frame supported bar 38 located below the bar 34 at the opposite side with respect to the racks 26, 27. Therefore, a roller 32 is rotatably mounted on the pivot 28″ at the right hand end of the rightmost rack 27 (FIG. 1), while a roller 36 is provided on the pivot 28 which links the rightmost rack 27 with the rack 27 which leftwardly thereof is next to it, and so on.

The rectilinear groove 33 of the bar 34 connects by a short rearwardly and leftwardly reaching groove portion 29 with a transverse rectilinear end portion 41. The bar 38 is integral with a plate 42 which is located preferably wholly within a right hand end plate of the machine frame. The groove 37 of the bar 38 connects with an enlarged continuation 44 in said plate 42 which extends forewards and outwards with respect to the groove 37 (downwards and rightwards in the FIGS. 1 and 2).

The device operates as follows.

When the pinion 22 is rotated counterclockwise, the rack means 24 is displaced rightwards. More specifically, the rack 26, through the lugs 29 and the lugs 31, moves the carriage 11 rightwards. In turn the rollers 32 and 36 (FIG. 3) slide in the corresponding grooves 33 and 37.

When the rightmost roller 32, after traveling rightwardly through the rectilinear groove 33 traverses the groove portion 39, the rightmost or first rack 27 becomes slightly rocked rearwardly, counterclockwise about the pivot 28 by which it is connected with the second rack 27. Then when the trailing roller 36 mounted on the pivot 28 of the first rack 27 moves from the groove 37 into the enlarged groove continuation 44 of the plate 44, the first rack 27 rocks forwardly counterclockwise on the pivot 28″. Meanwhile, the second rack 27 rocks or folds clockwise forwardly on the pivot 28 which connects it with the third rack 27. Therefore, while the third rack 27, guided by the rollers 32 and 36, is respectively guided in the linear grooves 33, 37, the roller 36 at the pivot 28 connecting the first and second rack 27 is being rightwardly guided by the groove continuation 44 for the first and second racks 27 to assume folded relations. Then, when the carriage is progressively further advanced toward the right hand end plate 40 of the machine, the other racks 27 become consecutively similarly folded to assume eventually the zig-zag positions between the grooves 41 and 44, as shown in FIG. 2.

When the carriage 11 is returned leftwards, the rack 26 is displaced leftwards therewith and the rollers 32 and 36 move respectively from the grooves 41 and 44 into the rectilinear grooves 33 and 37, whereby the racks 27 become again lined up with the rack 26 for cooperation with the pinion 22, as shown in FIG. 1.

According to a second embodiment of the invention shown in FIGS. 4, 5 and 6, the rack means 24 for the control of the carriage 11 comprises (see FIG. 4) at each end of the rack 26, jointed thereto a rack 27. Specifically, each of said racks 27 carries, secured to it at the end next to the rack 26, a short plate 51 which by a pivot 52 on the rack 26 is pivotally connected therewith. The extending end of each rack 27, of which only the left one is shown, has a device 55 associated therewith to guide it along a bar 73 of circular cross section. Such bar 73 comprises parallel to the carriage rail 15 a rectilinear bar portion 68. Near each lateral end of the machine, an arcuate portion 69 of said bar 73 reaches forwardly and ends in a linear portion 74 which is inside of a lateral side plate 75 of the machine. Rigidly carried on the side plates 75 is a strong support bar 71 for the bar portion 68. It extends parallel to the bar portion 68 thereabove in a spaced relation thereto. A series of elements 70 reach at spaced intervals down from the support bar 71 to give support to the bar portion 68. Elements 72 directly secure the bar portions 69 and 74 to the machine frame.

Each of said guiding devices 55 comprises a horse shoe shaped plate 58 which during travel of said devices passes the elements 70 freely. Each of said devices 55 have three lugs numbered 57, 59 and 61 which face variously toward the bar 73 from three sides spaced 120° from each other. The lug 57 is horizontally below the bar 71 and thus horizontally below the horizontal plane in which the portions 68, 69 and 74 of the bar 73 lie. A drum 56 of each device 55 has a portion 54 whereby it is riveted to the lug 57. The outer end of each rack 27 has a hole 53 by which it is pivotally associated with the drum 56 (see FIGS. 5 and 6) so that each device 55 is moved along by its related rack 27. The lugs 59 and 61 carry each a drum 62 which is similar to the drum 56. Each of said drums 56 and 62 has a diametrical notch radially facing toward the bar 73 and accommodating therein a roller 67 which has an integral pivot pin 66 rotatively seated in a pivot groove or seat 63. Obviously, each of said devices 55, due to its rollers 67 is adapted to roll along the various portions 68, 69 and 74 of the bar 73.

Thus, when the carriage is moved to either side of the machine, the rack 27 at such side will fold into an angular relation to the rack 26, closely to the inside of the machine side plate 75, as shown in FIG. 4. The rack 27 will return into alignment with the rack 26 whenever the carriage 11 is brought again towards the central area of the machine.

It is intended that many changes, improvements and additions of parts may be made to the described displacing device without departing from the scope of the invention as defined by the appended claims. For example, in the embodiment of FIG. 1 the racks 27 may be arranged in part at the right and in part at the left of the rack 26. In such case the grooves 33 and 37 of the bars 34 and 38 would be provided with groove continuations similar to the rightwardly extending continuations 33, 41 and 44. Concerning the embodiment of FIG. 4, a single rack 27 at only one end of the rack 26 may be provided.

What is claimed is:

1. In a typewriter or similar machine having a frame, a typecarrier carriage linearly movable on said frame along a typing line, opposite side walls between which the carriage is movable, rack means movably associated with said carriage, and means cooperative with said rack means to control the position of said carriage, said rack means comprising, a rack expanse movable with the carriage in a parallel relation thereto, and a rack at least at one end of said rack expanse, swingably connected to the latter and adapted to have a linearly extending relation thereto but being swingable thereon to an angular relation thereto, and means to guide said swingable rack by guiding cooperation therewith to move as a rectilinear extension of said rack expanse while the carriage moves through a certain zone of travel and further to guide said swingable rack into an angular relation to said rack expanse while the carriage moves beyond said zone of travel in the direction in which said swingable rack is adapted to extend linearly from said rack expanse, whereby as said rack expanse moves toward one of said side walls, said swingable rack becomes contracted toward said rack expanse substantially so as not to transgress beyond such wall.

2. The invention set forth in claim 1 said guide means comprising, a guiding element projecting from said swingable rack near the end thereof, and a guide-groove-affording-means whereinto said guiding element projects, said guide-groove-affording-means having a rectilinear groove portion extending parallel to said rack expanse to guide said swingable rack by said guiding element to move as a rectilinear extension of said rack expanse, said guide-groove-affording-means having further a groove portion which curves away from said rectilinear groove portion so as to guide said swingable rack by said guiding element into said angular relation to said rack expanse.

3. The invention set forth in claim 1, said guide means comprising a bar having a rectilinear portion extending parallel to said rack expanse to guide said swingable rack to move as a rectilinear extension of said rack expanse, said guide means comprising further at one end of its rectilinear portion a bar portion curving away from the rectilinear portion to guide said swingable rack into an angular relation to said rack expanse.

4. The invention set forth in claim 3, said guide means comprising a device pivotally carried on said swingable rack and guided to follow along the guide portions of said bar.

5. The invention set forth in claim 4, said bar being of round stock, and said device comprising three rollers diametrically facing said bar from three sides thereof to roll therealong.

6. In a typewriter or similar machine having a frame a typecarrier carriage linearly movable on said frame along a typing line rack means movably associated with said carriage, and means cooperative with said rack means to control the position of the carriage, said rack means comprising, a rack expanse movable with the carriage always in a parallel relation thereto, a series of racks extending in a sequential order from one end of said rack expanse, and a series of pivots joining said rack expanse and said racks endwise together in a progressive order from said rack expanse, and means to guide said racks in rectilinear alignment with said rack expanse until in the direction in which said racks extends from said rack expanse the carriage has traveled beyond a certain point, and then to guide the racks which successively pass said point to fold into zig-zag compacted relations, said guiding means comprising, a single guide element projecting from each rack transveresly thereof from near that end which extends away from said rack expanse, said guide elements projecting from said racks alternately to opposite sides thereof, and a guiding member at each of the transversely opposite sides of said racks wherewith the oppositely projecting guiding elements will cooperate successively to cause said racks to fold into zig-zag compacted relations as said racks travel beyond said point.

7. The invention set forth in claim 6, said guide elements, except one that is carried on the rack farthest from said rack expanse, being carried on said pivots.

8. The invention set forth in claim 7, each guide element being in the form of a rotatively mounted roll.

9. In a typewriter or similar machine having a frame, a typecarrier carriage linearly movable on said frame along a typing line, rack means movably associated with said carriage, and means cooperative with said rack means to control the position of said carriage, said rack means comprising, a rack expanse movable with the carriage always in a parallel relation thereto, a series of racks extending in a sequential order from one end of said rack expanse, and a series of pivots joining said rack expanse and said racks endwise together in a progressive order from said rack expanse, a single guide element projecting transversely from each rack from near that end thereof which extends away from said rack expanse, said guide elements projecting from said racks alternately to opposite sides thereof, a guide means related with those guide elements which project to one side of said racks, a guide means related with those guide elements which project from the other side of said racks, each said guide means having a rectilinear groove portion wherein each guide element related to such guide means is adapted to travel, said recilinear groove portions in conjunction with said guide elements adapted to guide in rectilinear alignment with said rack expanse such of said racks as happen to be intermediate said rack expanse and any guide element traveling in either of said rectilinear grooves, and a groove continuation extending from each rectilinear groove in a direction away from said rack expanse, such groove continuations being correlated in respect to each other so that movement of said racks which bring said guide elements sequentially into said groove continuations will cause said racks succesively to fold into zig-zag compacted relations.

References Cited

UNITED STATES PATENTS

| 444,119 | 1/1891 | Boruff | 197—82 X |
| 978,522 | 12/1910 | Waldheim | 197—82 X |
| 2,028,747 | 1/1936 | Horton et al. | 197—82 |

EDGAR S. BURR, *Primary Examiner.*

U.S. Cl. X.R.

197—18